May 12, 1942. T. R. BLACK 2,282,699
POWER TRANSMISSION UNIT
Filed Nov. 20, 1939 2 Sheets-Sheet 1

Inventor
Theodore R. Black
H. L. Walker
Attorney

May 12, 1942. T. R. BLACK 2,282,699
POWER TRANSMISSION UNIT
Filed Nov. 20, 1939 2 Sheets-Sheet 2
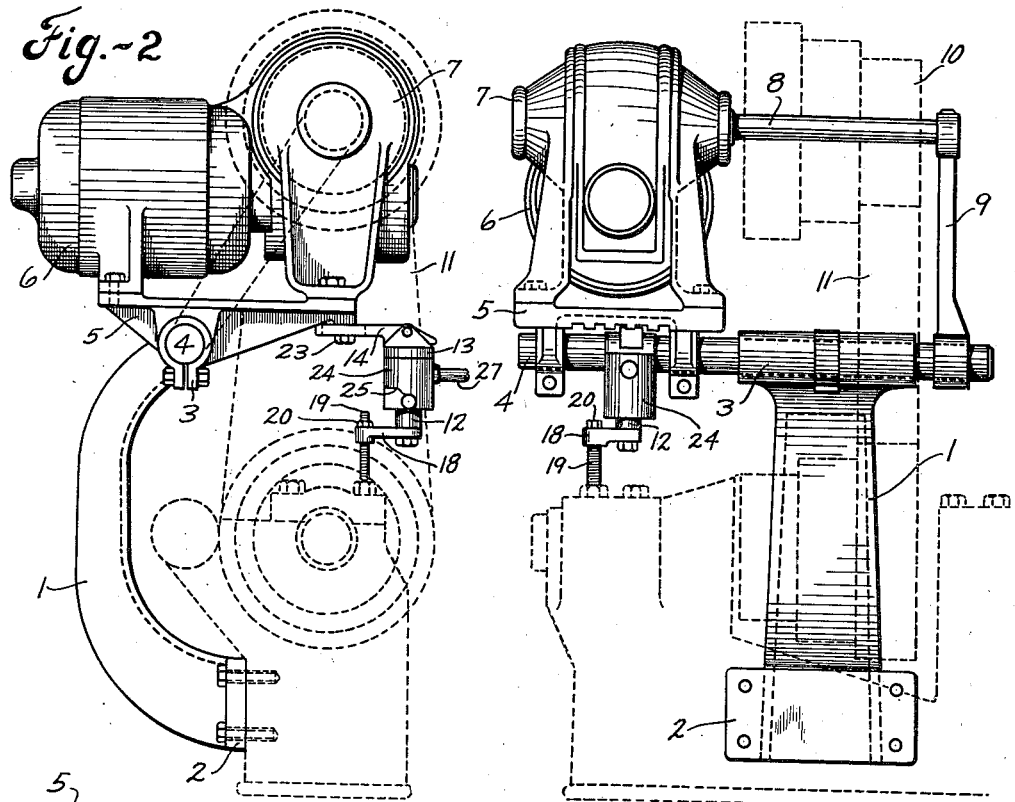
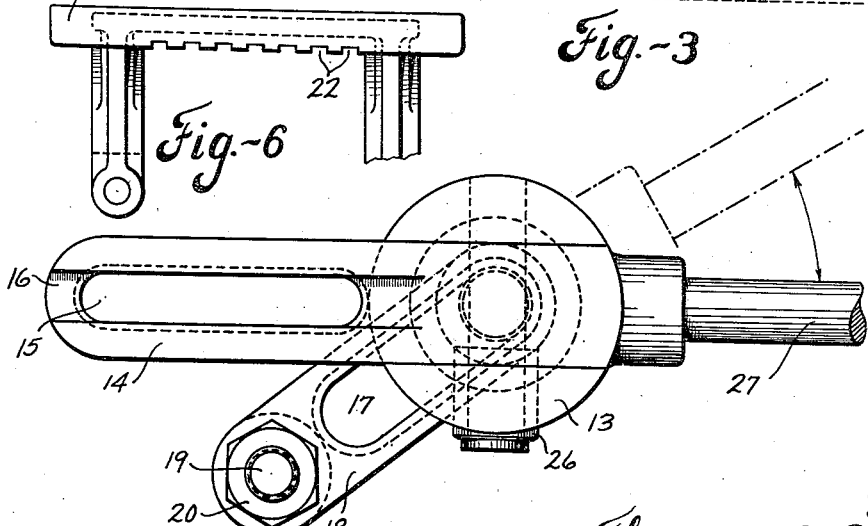
Inventor
Theodore R. Black
By J. L. Walker
Attorney Patented May 12, 1942

2,282,699

UNITED STATES PATENT OFFICE 2,282,699

POWER TRANSMISSION UNIT

Theodore R. Black, Tippecanoe City, Ohio, assignor to The Master Electric Company, Dayton, Ohio, a corporation of Ohio Application November 20, 1939, Serial No. 305,312

16 Claims. (Cl. 248—16)

This invention pertains to power transmission units, and more particularly to a unitary mounting table or support for an electric motor, universally applicable to a wide variety of apparatus of different character, style and shape.

Factory line-shaft belt drives having become obsolete and having been replaced by individual motor drive units, there exists a demand for a mounting table or stand for electric drive motors which is readily and universally applicable to various machine tools, including lathes, shapers, milling machines, drill and punch presses, and other mechanism, which embodies sufficient adjustability to accommodate it to different conditions of use and different applications, and further embodying ample adjustability in its final adaptation to serve as a belt tightener to enable adjustment of the tension of the intermediate drive belt between the motor and driven mechanism. While its application to only machine tools has been mentioned for illustrative purpose, it is to be understood that the present mount is suitable for a wide variety of other installations.

The object of the invention is to improve the construction, as well as the means and mode of operation of power transmission unit mountings, whereby they may not only be economically manufactured, but will be of compact form, readily adaptable to a wide variety of power driven apparatus, efficient in use, having relatively few operating parts, and unlikely to get out of repair.

A further object of the invention is to provide a universally adjustable rest for the motor mounting engageable throughout a wide range with a machine or other apparatus upon which the motor mount is attached, and to further provide in conjunction therewith elevator means by which the mount is variable relative to the supporting and driven mechanism to vary the tension of a driving belt connecting the motor therewith.

A further object of the invention is to provide a motor mount possessing the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a perspective view of an assembled motor drive unit embodying the present invention.

Figs. 2 and 3 are respectively a side elevation and a front elevation thereof.

Fig. 5 is a top plan view thereof.

Fig. 6 is a fragmentary front elevation of the motor supporting table.

Like parts are indicated by similar characters of reference throughout the several views.

Figure 1:
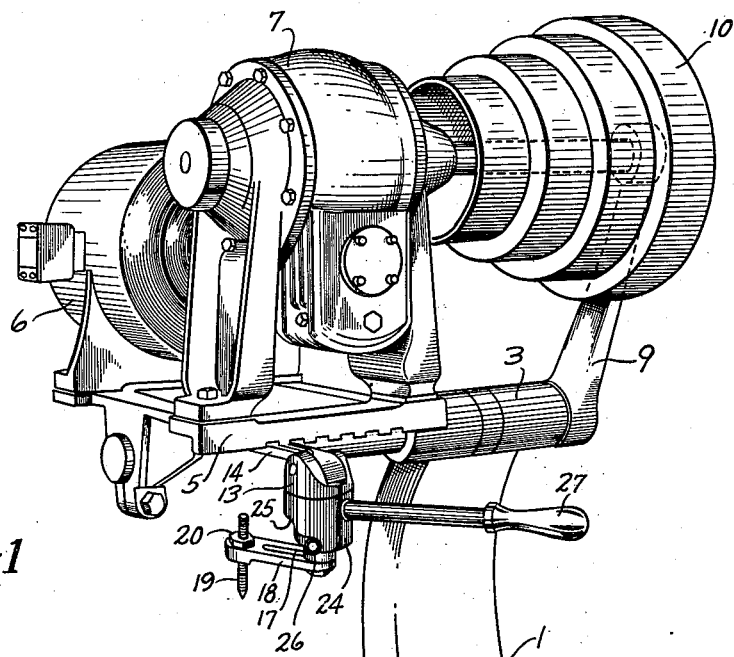
Figures 4, 7:
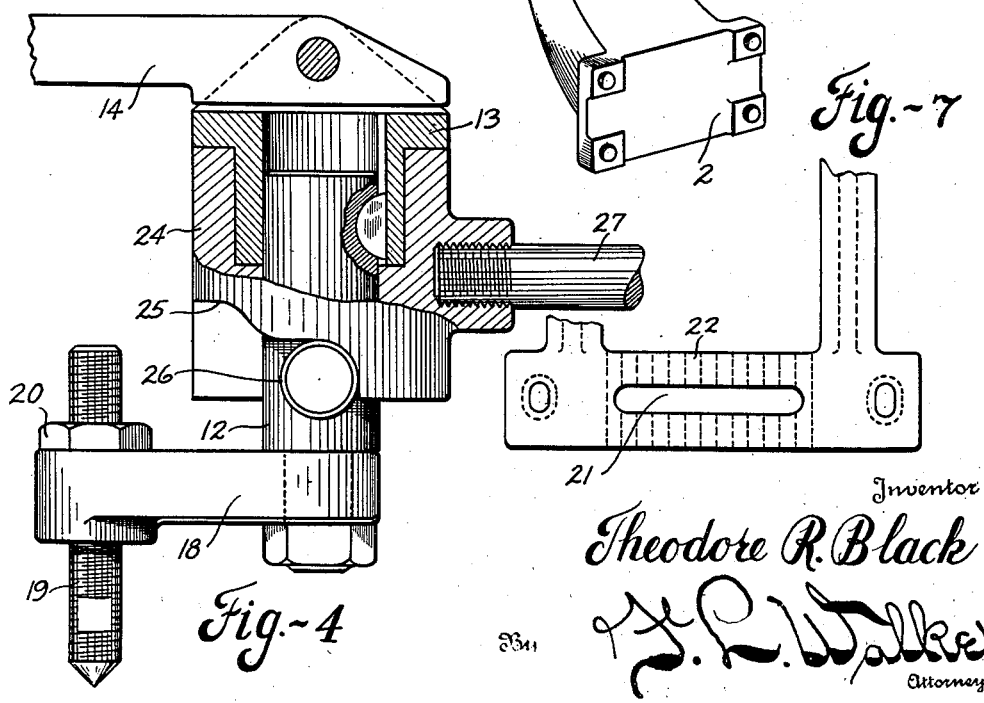
Fig. 4 is a side elevation, partly in section, of the universally adjustable supporting rest for the motor table.
Fig. 7 is a similar top plan view thereof.

Referring to the drawings, 1 indicates an arcuate bracket arm or pedestal having at its lower end a head 2 for fixed attachment to the frame or bed of a machine or apparatus to be driven. In Figs. 2 and 3 this bracket arm is shown attached to the head stock of a lathe, indicated by dotted lines. The arcuate shape of the bracket arm 1 avoids interference with existing parts of the machine to which it may be attached. Otherwise, its particular shape is not essential. At its upper end, the arm or pedestal 1 is a bearing head 3 receiving a transverse shaft 4. Mounted on the shaft 4 for to and fro oscillatory motion is a motor supporting table 5. Upon the rocking table 5 is an electric motor 6 which in the present instance is of a gear head type, having within as part 7 of the motor casing a speed reduction gear train actuating the drive shaft 8 at a reduced speed of rotation. The motor 6 is disposed with its axis transverse to the axis of oscillation of the table while the drive shaft 8 is parallel thereto. The outer end of the drive shaft 8 is supported in a standard 9 also carried by the shaft 4, in the upper end of which the drive shaft is journaled. Carried by the drive shaft 8 is a cone or stepped pulley 10, from which power is transmitted to the driven mechanism by a belt 11, indicated by dotted lines in Figs. 2 and 3.

The fact that the driving motor 6 is disposed with its axis at right angle to the drive shaft 8 is incidental to the type of speed reduction mechanism employed. For some installations the motor may be directly connected, or other type of transmission gearing may be employed necessitating different disposition of the motor. The rocking table 5 and shaft support 9 are preferably, but not necessarily, fixedly secured to the shaft 4 and the latter mounted for rocking motion in the head 3 of the bracket arm or pedestal 1. The pivotal axis of the rocking table 5 is offset toward the rear so that the preponderance of weight of the motor and power transmission mechanism is forward thereof, and hence out of balance.

To adjustably support the weighted forward portion of the oscillatory table 5, there is provided a universally adjustable foot, or elevator. This support embodies a vertical stud 12, to the upper end of which is slidingly keyed for relative axial but non-rotative motion a bifurcated non-rotative head 13, between the furcations of which a slotted arm 14 is pivotally mounted for very limited oscillatory motion. Coincident with its longitudinal slot 15, the arm 14 is also channeled or grooved at 16 beyond the ends of the slot. (See Fig. 5.)

At its lower end the stud 12 is adjustably clamped in a slot 17 of a laterally extending arm 18 capable of both to and fro longitudinal and rotary adjustment relative to the stud. At its extremity the slotted arm 18 carries a screw threaded sharpened pin 19, adjusted axially relative to the arm 18 and secured in adjusted position by a lock nut 20. The forward margin of the rock table 5 is provided with a transverse slot 21. The under side of the table adjacent to the slot 21 is corrugated at 22. The corrugations 22 agree with the groove 16 and slot 15 of the arm 14. A clamp bolt 23 engaging simultaneously in the slot 15 of the arm 14 and in the slot 21 of the table at their intersection enables the arm to be secured in any one of a number of different positions relative to the table. The arm 14 may be adjusted transversely of the table within the limit of the slot 21 and secured with any selected corrugation or rib 22 seated in the groove 16 and slot 15 of the arm 14. In such adjusted relation the arm is further longitudinally adjustable within the limit of the slot 15. That is to say, the arm 14 is relatively adjustable laterally of the table or longitudinally of the arm, but is not rotatively adjustable relative to the table. It is secured in its position of adjustment by tightening the clamp bolt 23.

The arm 18 at the lower end of the supporting foot may be adjusted longitudinally and rotatively relative to the stud 12 as may be necessary to locate the pin 19 on a suitable or convenient part of the machine or apparatus to which the mount is applied. Surrounding the stud 12 and a reduced portion of the head 13 is a cam sleeve 24, having therein a cam indentation 25 which rides upon a roller 26 projecting laterally from the stud 12. The cam sleeve 24 may be oscillated to and fro by a hand lever 27. As the cam 25 rides upon the roller 26 in one direction of rotation of the sleeve 24, the sleeve is elevated upon the stud carrying with it the head 13 and arm 14 bolted to the rock table 5. Upon reverse rotation of the cam sleeve, the head 13 and with it the rock table 5 are allowed to descend. Such adjustment of the table 5 is utilized to release the tension on the drive belt 11 to permit it to be shifted from one step to another of the cone pulley and thereafter tightened in its new position by elevation of the table. In the initial adjustment, the belt is tightened to the required operating tension by adjusting the screw threaded pin 19. Thereafter the cam sleeve 24 is utilized to slacken and restore the tension of the belt upon shifting from one step to the other of the cone pulley. The differential movement of the table and reciprocatory head 13 is compensated by the pivotal connection of the arm 14 with the head 13.

The device is readily adjustable within a relatively large field to find suitable footing upon the machine for the rest or pin 19. This pin may be brought to any point within a circular field described by rotating the arm 18 about the stud 12. This field may be further shifted either fore and aft or transversely by changing the arm 14 in its relation with the table 5. When secured the support is quite rigid but always subject to vertical adjustment of the table by rotation of the cam sleeve 24.

The structure is compact, strong and necessitates a minimum number of parts. One of the characteristic features of the present device is that the supporting foot or elevator is connected directly to the rock table, omitting any intermediate members, thus reducing the number of parts required yet performing all the necessary functions, and affording an extremely wide range of possible adjustment.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A power transmission unit wherein an electric motor and a cone pulley driven thereby are mounted on a supporting table which is mounted for rocking motion about a horizontal axis, an upright telescopically adjustable standard supporting the table against oscillatory motion in at least one direction, a laterally extending arm carried by the upper end of the standard and adjustably connected with a movable portion of the table in offset relation with the standard, a second laterally extending arm adjustably carried by the lower end of the standard, a vertically adjustable rest carried by the extremity of the last mentioned arm and engageable with the supporting structure, and elevator means for axially adjusting the telescopic standard to vary the tension of a drive belt connecting the cone pulley and a driven pulley.

2. In a power transmission unit of the type wherein an upright supporting pedestal supports a power transmission unit on a motor table hinged for rocking motion about a horizontal axis in operative relation with a driven mechanism, a gear head motor mounted thereon with its axis substantially perpendicular to the pivotal axis of the table, including a transverse driven shaft disposed in substantially parallel offset relation with the axis of oscillation of the table, elevator means for the table including an extensible and retractible standard, a laterally extending arm carried thereby directly connecting the standard with a movable portion of the table for limiting the movement thereof in at least one direction, a second laterally extending arm carried by the standard adjustably connecting the standard with the driven mechanism to rest the table thereon, and means for adjusting the standard to correspondingly adjust the table about its axis of oscillation.

3. The combination with a power transmission unit support mounted for oscillatory motion, of a supporting foot therefor limiting its oscillation in one direction, including an axially adjustable standard, means for adjusting the standard to effect oscillation of the support, and an arm pivotally connected to the standard and attachment means fixedly engaging the arm with the support in any one of several positions of longitudinal and lateral adjustment.

4. The combination with a power transmission unit support mounted for oscillatory motion, of a supporting foot therefor limiting its oscillation in one direction, including an axially adjustable standard, means for adjusting the standard to effect oscillation of the support, a longitudinally recessed arm carried by the standard, a series of parallel spaced corrugations upon the support with any one of which the arm is engageable for longitudinal sliding adjustment, and means for locking the arm in adjusted relation with the support.

5. The combination with a power transmission unit support mounted for oscillatory motion, of a supporting foot therefor limiting its oscillation in one direction, including an axially adjustable standard, means for adjusting the standard to effect oscillation of the support, an arm carried by the standard for adjustable engagement with the support, intermeshing corrugations upon the arm and standard interchangeably engageable with each other, the arm being longitudinally adjustable relative to the support while in intermeshing engagement with selected corrugations thereof, and means for locking the arm in its adjusted relation with the support.

6. The combination with a power transmission unit support mounted for oscillatory motion, of a supporting foot therefor limiting its oscillation in one direction, including an axially adjustable standard, means for adjusting the standard to effect oscillation of the support, a longitudinally slotted arm carried by the standard, said unit support having therein an elongated slot relative to which the arm slot is disposed in transverse relation and a clamp bolt at the intersection of said slots for securing the arm in adjusted relation with the support, the construction and arrangement being such that the arm and with it the attached standard are capable of adjustment relative to the support longitudinally and transversely of the arm.

7. The combination with a power transmission support mounted for oscillatory motion of a supporting foot therefor limiting its oscillation in at least one direction and engageable with the support for relative adjustment in either of transverse directions, including a stud, a head telescopically assembled thereon and keyed thereto for independent axial sliding adjustment but held thereon against relative rotative movement, a cam sleeve surrounding the stud and bearing at one end against the relatively adjustable head, a cam surface on the sleeve and a projection on the stud with which the cam surface operatively engages to axially adjust the head upon the stud by rotative adjustment of the cam sleeve thereabout.

8. The combination with an oscillatory support for a power transmission unit and a supporting pedestal therefor, of an elevator therefor including a stud, a collar mounted thereon for non-rotative axial sliding adjustment, a rotative cam sleeve surrounding the stud and having thrust engagement at one end of said adjustable collar and at its opposite end on the stud, and laterally extending relatively spaced arms carried by the collar and stud respectively adjustably connecting the elevator with the oscillatory power transmission unit support and with a supporting structure relative to which the support is to be adjusted.

9. The combination with an oscillatory support for a power transmission unit and a mounting therefor of elevator means for said support including a pair of relatively spaced arms adjustably engageable respectively with the oscillatory support in advance of the center of oscillation thereof and with a structure upon which the support is mounted, and a cam device intermediate said arms for effecting the separation and controlling the approach of said arms to correspondingly adjust the oscillatory support about its axis of oscillation.

10. The combination with an oscillatory support for a power transmission unit and a mount therefor of elevator means for adjusting the support about its axis of oscillation including a pair of relatively spaced arms, one of which is directly attached to the oscillatory support in spaced relation with the center of oscillation thereof and the other of which has an adjustable rest upon a supporting structure, and an intermediate rotative member for effecting the separation and limiting the approach of said arms and thereby effecting adjustment of the support about its axis.

11. The combination with an oscillatory support for a power transmission unit and a mounting therefor, of adjustable elevator means directly connected with a free portion of the table in spaced relation with its axis of oscillation, a laterally extending arm having both longitudinal and rotative adjustment with the elevator and a rest carried by the arm engageable with a supporting structure within range of adjustment of said arm.

12. The combination with an oscillatory support for a power transmission unit and a mounting therefor, of adjustable elevator means directly connected with a free portion of the table in spaced relation with its axis of oscillation, a laterally extending slotted arm, a stud on the elevator fixedly engageable in the slot of the arm in various positions of longitudinal and rotative adjustment of the arm and a rest carried by the arm in offset relation with the elevator engageable with a supporting structure within the range of adjustment of the arm.

13. The combination with an oscillatory support for a power transmission unit and a mounting therefor, of adjustable elevator means directly connected with a free portion of the table in spaced relation with its axis of oscillation, a laterally extending arm carried by the elevator in longitudinally and rotatively adjustable relation therewith, and a rest carried by the arm in laterally offset relation with the elevator and adjustable perpendicularly to the arm for engagement with a supporting structure within the range of adjustment of said arm.

14. The combination with an oscillatory support for a power transmission unit and a mounting therefor, of an elevator means for adjusting the support about its axis of oscillation including a substantially horizontal arm fixedly attached to a vibratory portion of the support in spaced relation with its axis of oscillation, a second substantially horizontal arm in spaced relation with the first mentioned arm engageable with a supporting structure relative to which said arm is vertically and laterally adjustable, and an adjustable coupling between said relatively spaced horizontal arms for varying the relation thereof to correspondingly vary the position of the support about its axis of oscillation.

15. A power transmission unit of the type wherein an electric motor and a driving pulley actuated by the motor are carried by a supporting table mounted for rocking motion, including an adjustable supporting foot secured to the free edge of the table for relative adjustment in transverse paths, an extension on said foot mounted for rotative and radial adjustment into engagement with a supporting body, and a vertically extensible and retractible connection in said foot for elevating and lowering the table.

16. In a transmission unit mounting wherein an electric motor mount is pivotally supported for rocking motion about a horizontal axis, a vertically extensible and retractile supporting foot for the oscillatory table having sliding engagement therewith for relative movement in either of transverse directions, and a rest for said foot engageable with a supporting body rotatively and radially adjustable to enable its supporting engagement in any one of a number of positions of relative adjustment, within the range of radial and rotative adjustment thereof.

THEODORE R. BLACK.